United States Patent
Lunt et al.

(10) Patent No.: US 11,831,058 B2
(45) Date of Patent: Nov. 28, 2023

(54) SYSTEMS AND METHODS OF FUEL CELL STACK COMPRESSION

(71) Applicant: Nuvera Fuel Cells, LLC, Billerica, MA (US)

(72) Inventors: Benjamin Steven Lunt, Beverly, MA (US); Filippo Gambini, Boston, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 208 days.

(21) Appl. No.: 16/042,327

(22) Filed: Jul. 23, 2018

(65) Prior Publication Data

US 2019/0027773 A1 Jan. 24, 2019

Related U.S. Application Data

(60) Provisional application No. 62/536,157, filed on Jul. 24, 2017.

(51) Int. Cl.
*H01M 8/248* (2016.01)
*H01M 8/0247* (2016.01)

(52) U.S. Cl.
CPC ......... *H01M 8/248* (2013.01); *H01M 8/0247* (2013.01)

(58) Field of Classification Search
CPC ...... H01M 8/248; H01M 8/0247; Y02E 60/50
USPC ....................................... 429/470
See application file for complete search history.

(56) References Cited

U.S. PATENT DOCUMENTS

| 4,368,109 | A | * | 1/1983 | Ford | H01M 8/0273 |
| | | | | | 204/253 |
| 5,484,666 | A | * | 1/1996 | Gibb | H01M 8/241 |
| | | | | | 429/434 |
| 6,361,895 | B1 | * | 3/2002 | Itou | H01M 8/247 |
| | | | | | 429/465 |

(Continued)

FOREIGN PATENT DOCUMENTS

WO    WO 96/09659 A1    3/1996

OTHER PUBLICATIONS

International Search Report and Written Opinion, dated Sep. 17, 2018, issued in International Patent Application No. PCT/US2018/043327 (12 pages).

*Primary Examiner* — Christian Roldan
(74) *Attorney, Agent, or Firm* — Finnegan, Henderson, Farabow, Garrett & Dunner, LLP (57) ABSTRACT

An electrochemical-cell stack assembly is provided. The assembly has an electrochemical-cell stack and a compression system that holds the electrochemical-cell stack in a state of compression. The compression system has a first endplate and a second endplate positioned at opposite ends of the electrochemical-cell stack. The compression system has a set of tension members coupled to the first endplate and the second endplate that maintain a fixed distance between the first endplate and the second endplate. The compression system has a compression plate disposed between the second endplate and the electrochemical-cell stack. The compression system has a compression member in contact with the compression plate, wherein the compression member is configured to transfer a force to the compression plate. The compression system has a locking nut fastened to the second plate. The locking nut secures the position of the compression member and compression plate relative to the second endplate.

7 Claims, 11 Drawing Sheets

(56) References Cited

U.S. PATENT DOCUMENTS

| | | | |
|---|---|---|---|
| 6,413,665 B1 * | 7/2002 | Blanchet | H01M 8/248 |
| | | | 429/511 |
| 6,720,101 B1 | 4/2004 | Dong et al. | |
| 7,037,618 B2 * | 5/2006 | Andrews | H01M 8/241 |
| | | | 429/511 |
| 2002/0034673 A1 | 3/2002 | Bisaka et al. | |
| 2003/0232233 A1 | 12/2003 | Andrews et al. | |
| 2011/0076585 A1 * | 3/2011 | Edmonston | H01M 8/2485 |
| | | | 429/454 |
| 2011/0265669 A1 * | 11/2011 | Padberg | H01M 8/1048 |
| | | | 100/38 |
| 2017/0025701 A1 * | 1/2017 | Tanaka | H01M 8/248 |

* cited by examiner

SYSTEMS AND METHODS OF FUEL CELL STACK COMPRESSION

This application claims the benefit of U.S. Provisional Application No. 62/536,157, filed Jul. 24, 2017, which is incorporated herein by reference in its entirety.

The present disclosure is directed towards systems and methods of compression, and, more particularly, systems and methods for fuel cell stack compression.

Electrochemical cells, such as fuel cells or electrolysis cells, are devices that may be used for generating current from chemical reactions or for inducing a chemical reaction using a flow of current. A fuel cell may convert the chemical energy of a fuel (e.g., hydrogen, natural gas, methanol, gasoline, etc.) and an oxidant (e.g., air or oxygen) into electricity and waste products (e.g., heat and water). A fuel cell may comprise a first electrode (e.g., a negatively charged anode), a second electrode (e.g., a positively charged cathode), and an ion-conducting material (e.g., an electrolyte). Different fuel-cell technologies may utilize different electrolyte materials.

A single cell may generally produce a relatively small electrical potential. Therefore, to increase the total output voltage, often individual cells may be stacked together (e.g., in series) to form a fuel cell or electrochemical-cell stack. The number of individual cells in an electrochemical-cell stack may depend on the application and the amount of output voltage required from the electrochemical-cell stack for that application. Electrochemical cells in a stack may be compressed and held by a compression system. Some existing compression systems for compressing electrochemical stacks use tie rods, bands, and/or springs to apply one or more compressive forces to the electrochemical-cell stack. Although existing compression systems provide a mechanism for holding an electrochemical stack in a state of compression, they are less than optimal. For example, these existing systems can be overly complex, heavy, and expensive. The procedure for compressing the stack utilizing existing systems is often long and complicated. In addition, the compression forces applied by existing compressions system are not always evenly applied across the stack, which can affect the contact resistance; electrical conduction; and porosity of gas diffusion layers, microporous layers, membranes of the cells within the stack, and other components. Thus, unevenly applied compression forces may affect the overall performance of the stack.

The disclosed systems and methods of fuel-cell stack compression are directed to overcoming one or more of the problems set forth above and/or other problems with existing technologies.

In one aspect, the present disclosure is directed to a method of compressing an electrochemical-cell stack. The method may include placing an electrochemical-cell stack on a first endplate and positioning a compression plate on the electrochemical-cell stack at an end opposite the first endplate. The method may also include arranging one or more compression members on the compression plate. The method may further include positioning a second endplate over the compression plate so that the one or more compression members align with one or more openings in the second endplate. The method may also include applying a force to the compression plate through the one or more compression members, wherein the force compresses the electrochemical-cell stack. The method may further include attaching one or more tension members to the first endplate and the second endplate, wherein the tension members are configured to maintain a fixed distance between the first endplate and the second endplate. The method may also include fastening one or more locking nuts to the second endplate, wherein the locking nuts are configured to secure the position of the one or more compression members and the compression plate relative to the second endplate.

In another aspect, the present disclosure is directed to an electrochemical-cell stack assembly. The assembly may include an electrochemical-cell stack and a compression system configured to hold the electrochemical-cell stack in a state of compression. The compression system may include a first endplate and a second endplate positioned at opposite ends of the electrochemical-cell stack and a set of tension members coupled to the first endplate and the second endplate and configured to maintain a fixed distance between the first endplate and the second endplate. The compression system may also include a compression plate disposed between the second endplate and the electrochemical-cell stack. The compression system may further include a compression member in contact with the compression plate, wherein the compression member is configured to transfer a force to the compression plate. The compression system may also include a locking nut fastened to the second plate, wherein the locking nut secures the position of the compression member and compression plate relative to the second endplate.

In another aspect, the present disclosure is directed to a compression system for an electrochemical-cell stack. The compression system may include a first endplate and a second endplate configured to be positioned on opposite sides of the electrochemical-cell stack and a set of tension members coupled to the first endplate and the second endplate and configured to maintain a fixed distance between the first endplate and the second endplate. The compression system may also include a compression plate configured to be disposed between the second endplate and the electrochemical-cell stack. The compression system may further include a compression member configured to contact the compression plate and transfer a force to the compression plate. The compression system may also include a locking nut configured to be fastened to the second plate, wherein the locking nut secures the position of the compression member and compression plate relative to the second endplate.

It is to be understood that both the foregoing general description and the following detailed description are exemplary and explanatory only and are not restrictive of the disclosure, as claimed.

The accompanying drawings, which are incorporated herein and constitute a part of this specification, illustrate embodiments of the present disclosure and, together with the description, serve to explain the principles of the disclosure.

Reference will now be made in detail to exemplary embodiments of the present disclosure, examples of which are illustrated in the accompanying drawings. Wherever possible, the same reference numbers will be used throughout the drawings to refer to the same or like parts. Although described in relation to an electrochemical cell for generating electricity, it is understood that the devices and methods of the present disclosure may be employed with various types of fuel cells or electrochemical cells, including, but not limited to, electrolysis cells, hydrogen purifiers, hydrogen expanders, and hydrogen pumps.

Figure 1:
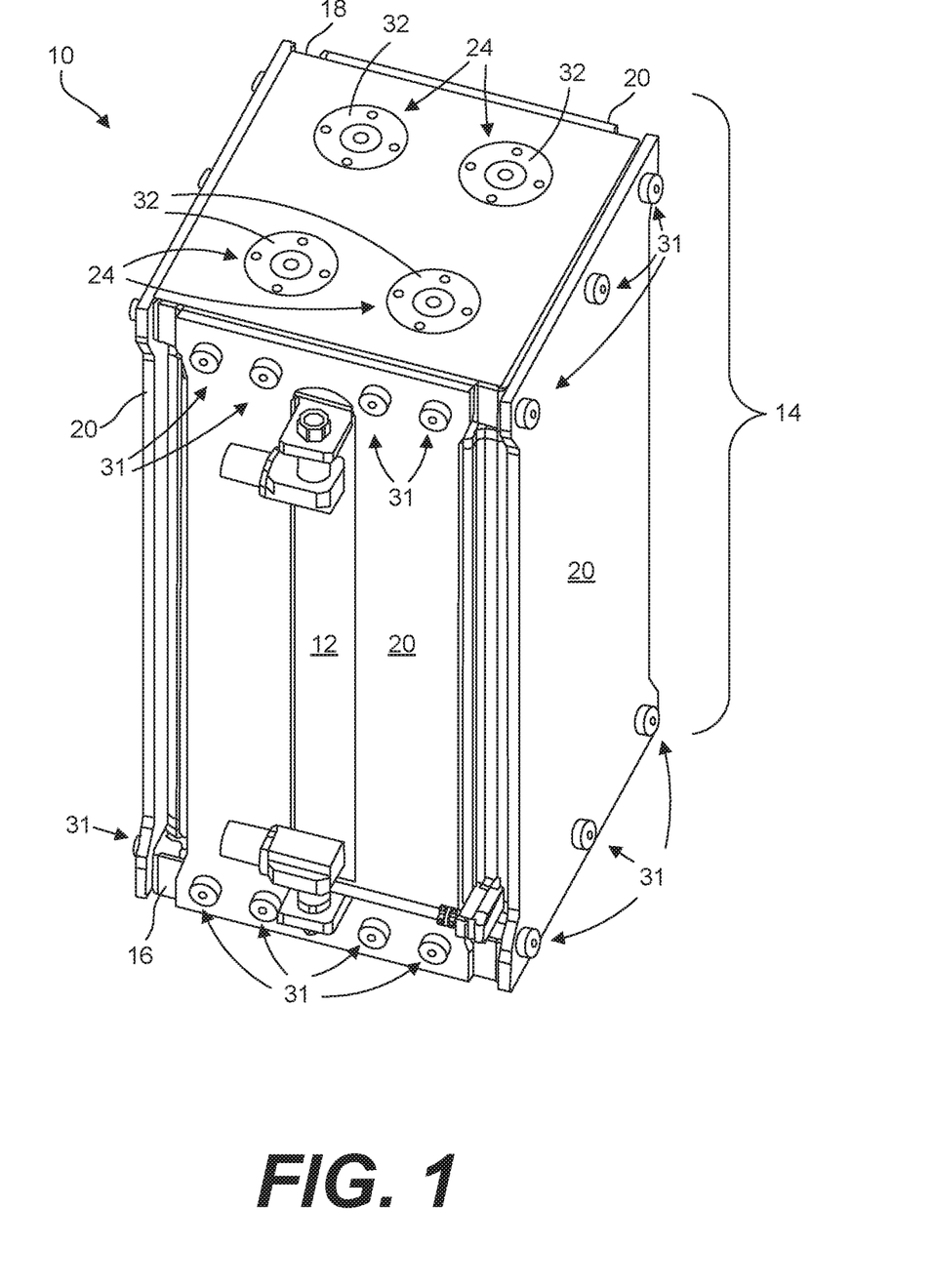
FIG. 1 is a perspective view of an electrochemical-cell stack assembly, according to an exemplary embodiment.

FIG. 1 shows a perspective view of an electrochemical-cell stack assembly 10, according to an exemplary embodiment. Assembly 10 may comprise an electrochemical-cell stack 12 and a compression system 14 configured to hold stack 12 in a compressed state. Electrochemical-cell stack 12, which may be referred to herein as stack 12, may include one or more electrochemical-cells stacked on top of one another (individual cells are not shown). Stack 12 as referred to herein may also include additional components, for example, current-collector plates, insulation sheets, coolant plates, etc.

Figure 2:
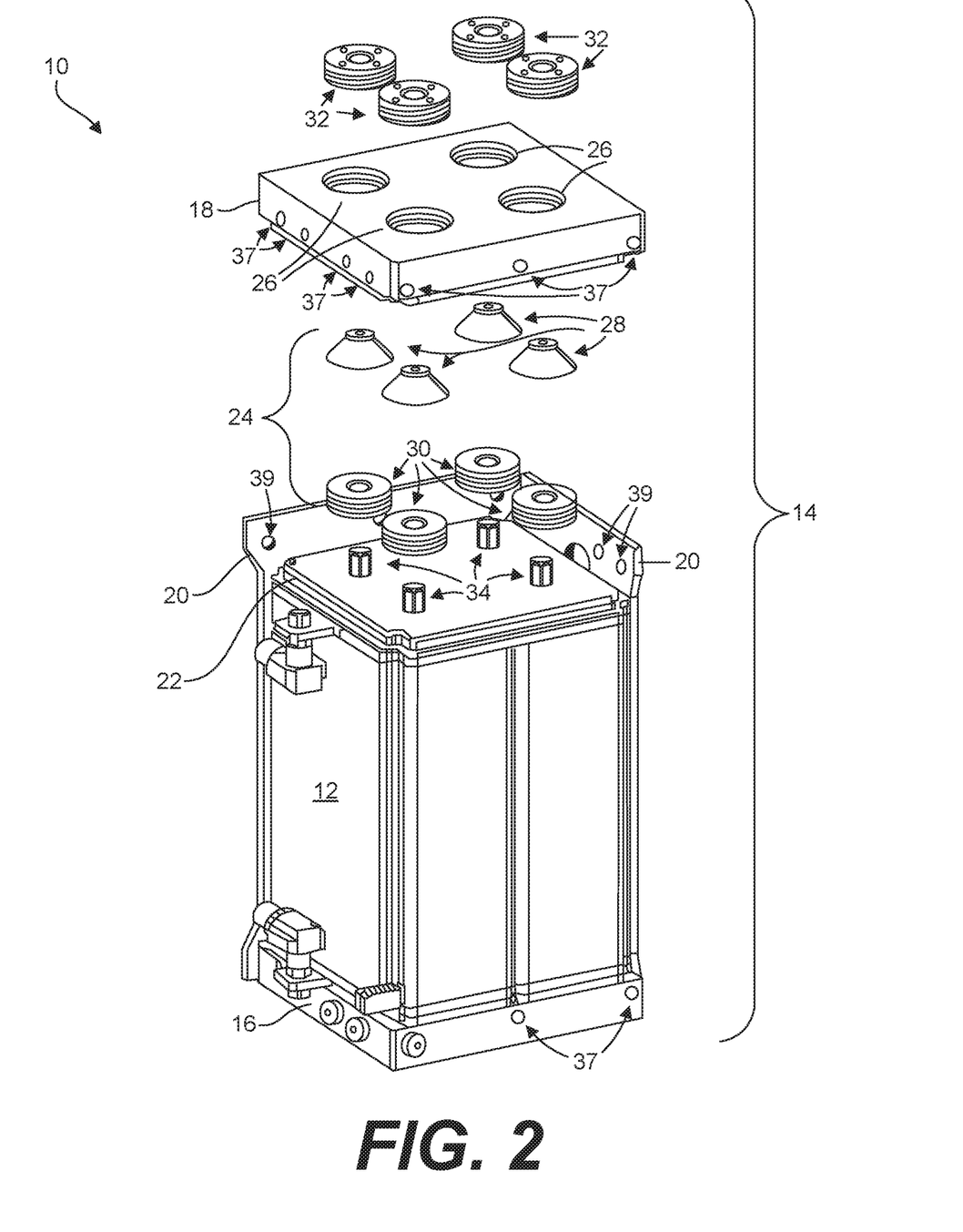
FIG. 2 is a partially exploded perspective assembly view of the electrochemical-cell stack assembly of FIG. 1, according to an exemplary embodiment.

FIG. 2 shows a partially exploded assembly view of electrochemical-cell stack assembly 10, according to an exemplary embodiment. Please note several components of assembly 10 shown in FIG. 1 have been removed to enable better viewing of the internal components. As shown in FIGS. 1 and 2, compression system 14 may comprise a first endplate, such as fixed endplate 16, and a second endplate, such as free endplate 18. Fixed endplate 16 and free endplate 18 may be configured to be positioned at opposite ends of electrochemical-cell stack 12. Fixed endplate 16 and free endplate 18 may be configured to be secured at a fixed distance from each other by one or more tension members, for example, a plurality of tension plates 20 that may be configured to extend along the outside of stack 12. Compression system 14 may also comprise a compression plate 22 configured to be disposed between free endplate 18 and stack 12. During initial compression of electrochemical-cell stack assembly 10, a compressive force may be applied (e.g., by a hydraulic press) to compression plate 22 toward fixed endplate 16, which can cause stack 12 to compress. The force may be transferred to compression plate 22 through one or more compression members 24 positioned within one or more corresponding openings 26 in free endplate 18. According to an exemplary embodiment, each compression member 24 may comprise a compression cap 28 and a stack of belleville-washers 30. During assembly, once a desired level of compression of stack 12 is achieved, one or more locking nuts 32 maybe secured to free endplate 18. Each locking nut 32 may be configured to secure the position of a compression member 24 and thereby also secure the position of compression plate 22 relative to free endplate 18 so that the compressed state of electrochemical-cell stack 12 may be maintained. According to an exemplary embodiment, fixed endplate 16 may be replaced with another instance of free endplate 18, compression plate 22, compression members 24, and locking nuts 32. In such embodiment, an external force may be applied to one end of compression system 14 while locking nuts 32 are tightened at the other end of compression system 14.

A method of compressing electrochemical-cell stack 12 using compression system 14, according to an exemplary embodiment, may begin with placing electrochemical-cell stack 12 on fixed endplate 16, as shown in FIG. 2. Placing stack 12 may include placing all of stack 12 at once or assembling stack 12 in pieces on top of fixed endplate 16. In some embodiments, one or more tension plates 20 may be attached to fixed endplate 16 prior to placement of stack 12 in order to facilitate proper alignment of stack 12 on fixed endplate 16. For example, as shown in FIG. 2, two tension plates 20 may be attached to adjacent sides of fixed endplate 16 in order to form a corner in which stack 12 can be wedged or pushed up against during placement.

Tension plates 20 may be coupled to free endplate 18 and fixed endplate 16 by any suitable means. For example, as shown in FIGS. 1 and 2, a plurality of endplate bolts 31 may pass through holes 39 in tension plates 20 and get screwed into corresponding endplate holes 37 in free endplate 18 and fixed endplate 16. It is contemplated that other attachment means may be utilized. For example, in other embodiments, tension plates 20 may be configured to have rails at each end that are designed to slide into corresponding slots formed in free endplate 18 and fixed endplate 16.

Following placement of stack 12, the method may comprise positioning compression plate 22 on stack 12 at the end opposite fixed endplate 16, as shown in FIG. 2. Compression plate 22 may be a generally flat plate configured to mate flush with an upper surface of stack 12. The shape of compression plate 22 may be configured to correspond with the shape of stack 12 and align with an active area of stack 12, as shown in FIG. 2. The active area of the stack may correspond to the aligned active area of each cell, which may include the overlapping area of an anode, a cathode, and electrolyte of each cell. Compression plate 22 may be made of carbon steel, stainless steel, aluminum, other metals, and/or plastic materials. Compression plate may have a thickness between about one quarter of an inch to about three quarters of an inch.

Figure 3:
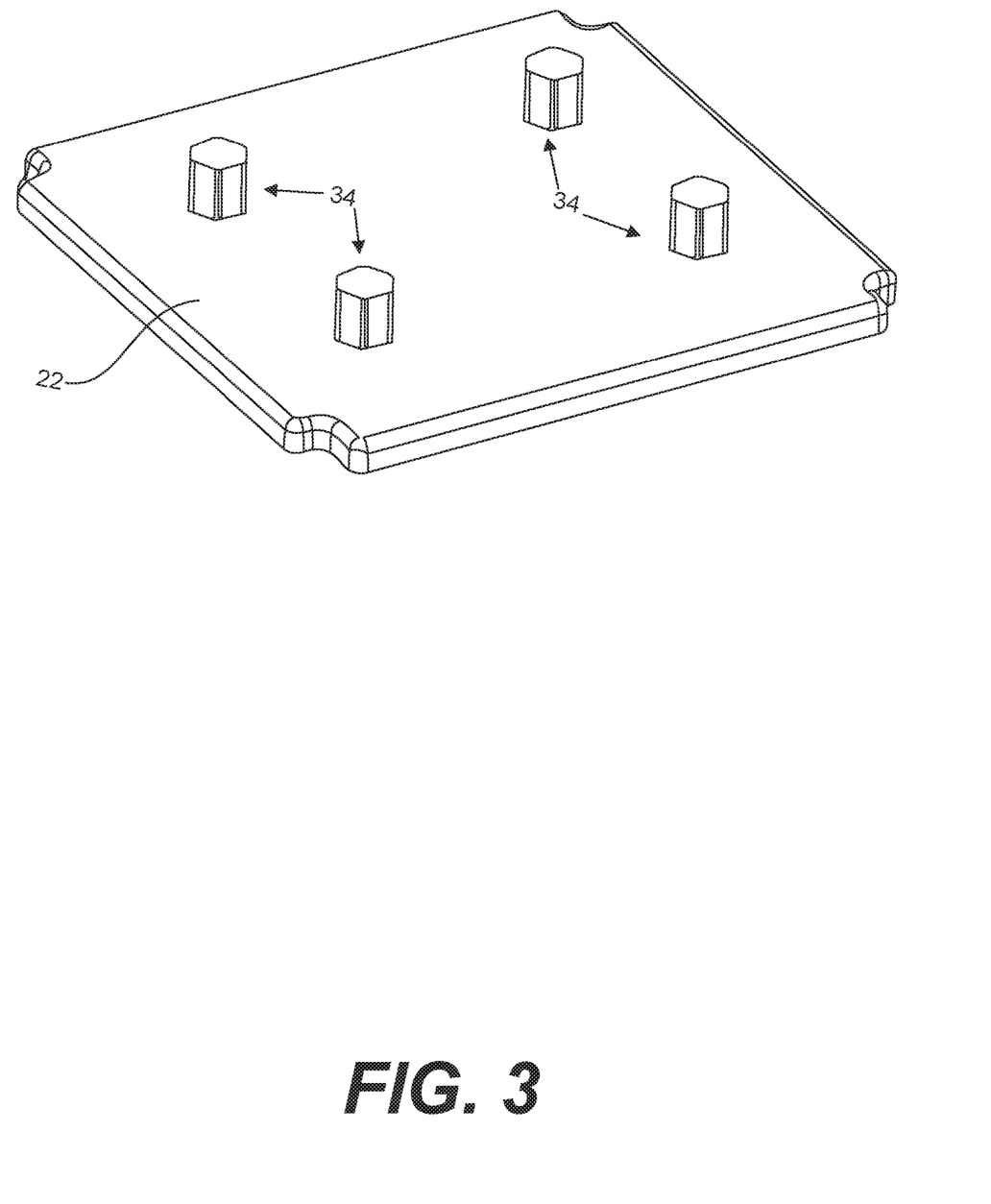
FIG. 3 is a top perspective view of a compression plate, according to an exemplary embodiment.

In some embodiments, compression plate 22 may include one or more alignment rods 34 extending from an upper surface away from stack 12, as shown in FIG. 2. FIG. 3 shows an enlarged perspective view of one exemplary embodiment of compression plate 22 having four alignment rods 34. As shown in FIG. 3, alignment rods 34 may be evenly distributed across the upper surface so they are about equidistant from a center of compression plate 22. In other embodiments, compression plate 22 may have a greater or lesser number of alignment rods 34. For example, in some embodiments, compression plate 22 may have one, two, three, five, six, eight, ten or more alignment rods. The number of alignment rods 34 and the size of compression plate 22 may increase or decrease proportionally to the cross-sectional area of stack 12. For example, a stack where each cell has an active area of between about 200 $cm^2$ to about 220 $cm^2$ may be compressed using compression plate 22 having four alignment rods 34 and four corresponding compression members 24. In another example, a stack where each cell has an active area between about 100 cm² to about 110 cm² may be compressed using compression plate 22 having two alignment rods 34 and two corresponding compression members 24. Thus, compression system 14 may be configured so that for about each 50 cm² of active area one compression member 24 may be utilized. An embodiment of compression plate 22 having only one alignment rod 34 may be configured such that the alignment rod is positioned in the center of compression plate 22. In an exemplary embodiment, a stack where each cell has an active area from about 250 cm² to about 350 cm² may be compressed using compression plate 22 having four or more alignment rods 34 and four or more corresponding compression members 24. In another exemplary embodiment, a stack where each cell has an active area from about 150 cm² to about 250 cm² may be compressed using compression plate 22 having four alignment rods 34 and four corresponding compression members 24. In an exemplary embodiment, a stack where each cell has an active area from about 50 cm² to about 150 cm² may be compressed using compression plate 22 having two alignment rods 34 and two corresponding compression members 24. It is to be understood that different quantities of alignment rods 34 and/or compression members 24 may be used.

Following placement of compression plate 22, the method of compressing stack 12 may comprise arranging one or more compression members 24 on compression plate 22. According to an exemplary embodiment, as shown in FIG. 2, compression system 14 may comprise four compression members 24 and arranging the compression members may include evenly distributing the four compression members 24 over the active area of stack 12. As described herein, each compression member 24 may include a compression cap 28 stacked on top of a belleville-washer stack 30. For embodiments where compression plate 22 includes alignment rods 34, belleville-washer stacks 30 may be arranged by placing each belleville-washer stack 30 so it surrounds each alignment rod 34.

Belleville-washer stack 30 may include a plurality of belleville-washers stacked one on top of the other. For example, as shown in FIG. 2, belleville-washer stack 30 may include four belleville-washers stacked one on top of another. In other embodiments, each belleville-washer stack 30 may include a greater or lesser number of belleville-washers. For example, in some embodiments, a belleville-washer stack 30 may include one, two, three, five, six, seven, or more belleville-washers.

Figure 4:
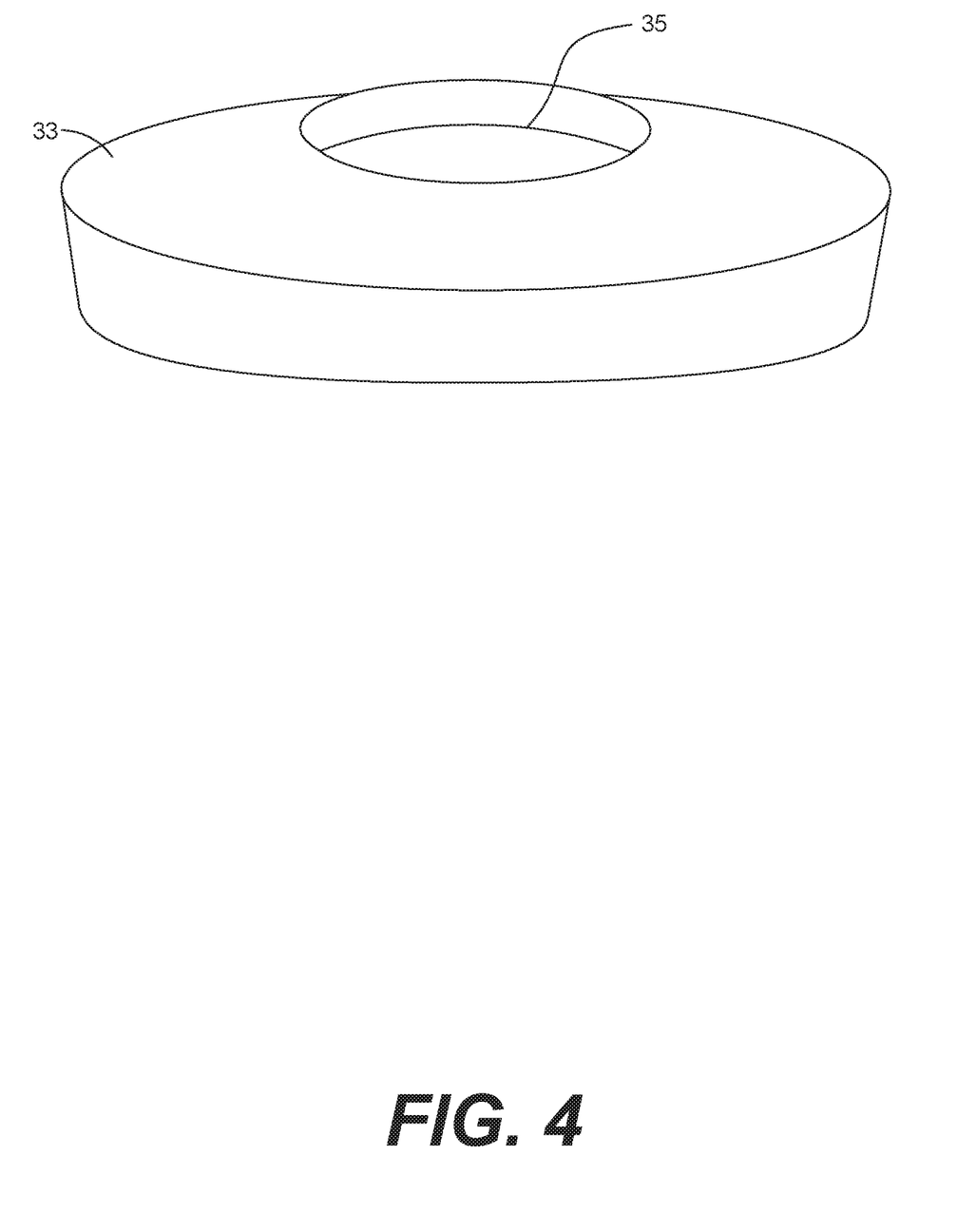
FIG. 4 is a top perspective view of a belleville-washer, according to an exemplary embodiment.

FIG. 4 shows a close-up perspective view of a belleville washer 33, according to an exemplary embodiment. As shown in FIG. 4, belleville washer 33 may have a substantially frusto-conical shape with a central through hole 35. Belleville washer 33 may be configured to exhibit spring-like properties and absorb vibrations and the expansion of components between free endplate 18 and fixed endplate 16 when under compression.

A plurality of belleville washers 33 may be stacked in various arrangements when forming a belleville-washer stack 30. For example, in a belleville-washer stack 30 having four belleville washers 33, the first two belleville washers can have a corresponding orientation so the washers mate flush with one another and the last two washers may have a corresponding orientation with one another, but may be flipped upside down relative to the first two belleville washers. The result is that the two belleville washers that are sandwiched between the outer-two belleville washers do not mate flush, but instead just their outer edges contact when uncompressed. It is contemplated that other arrangements of belleville washers 33 may be used to form a belleville-washer stack 30.

Figure 5:
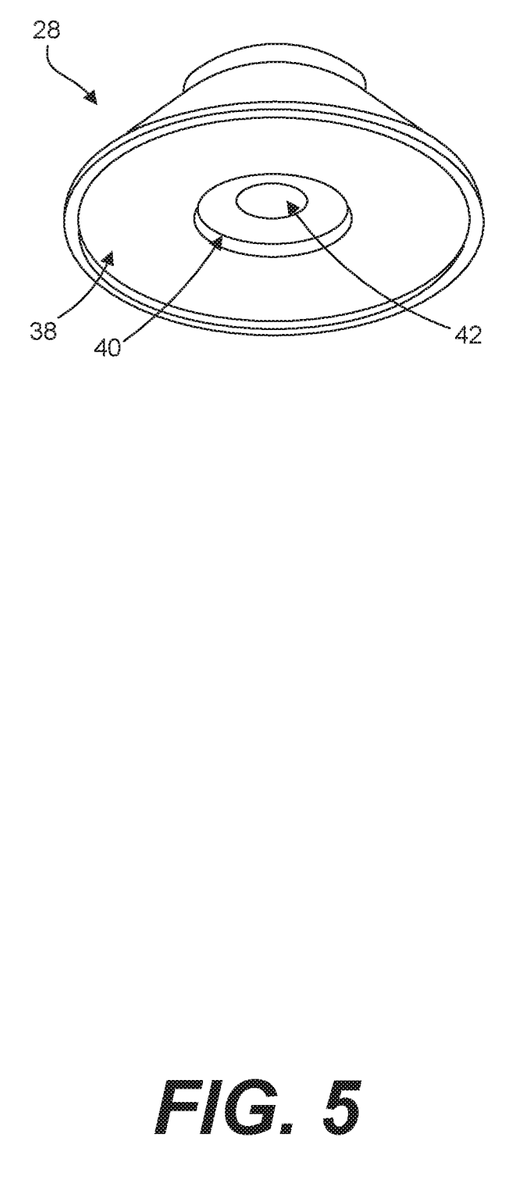
FIG. 5 is a bottom perspective view of a compression cap, according to an exemplary embodiment.

FIG. 5 shows a close-up bottom perspective view of compression cap 28, according to an exemplary embodiment. Compression cap 28 may be configured to transfer a compression force to a belleville-washer stack 30 upon which it is placed during compression of stack 12. Compression cap 28 may also be configured to transfer a compression force between locking nut 32 and belleville-washer stack 30 once locking nut 32 has been fastened and secured in place.

As shown in FIG. 5, compression cap 28 may have a substantially frusto-conical shape. Compression cap 28 may also include a first recessed cavity 38 configured to receive a portion of a belleville washer 33 and a second recessed cavity 40 concentric and deeper than first recessed cavity 38. Second recessed cavity 40 may be configured to receive a portion of an alignment rod 34 when a compression member 24 (i.e., compression cap 28 and belleville-washer stack 30) are placed over and around an alignment rod. First recessed cavity 38 and second recessed cavity 40 may be configured to facilitate alignment during positioning of the one or more compression members 24. Compression cap 28 may also include a central through hole 42, as illustrated in FIG. 5.

Referring back to FIG. 2, following placement of one or more compression members 24, the method of compressing stack 12 may comprise positioning free endplate 18 over compression plate 22 so that the one or more compression members 24 align with the one or more openings 26 in free endplate 18. In some embodiments, free endplate 18 may be positioned prior to placement of compression members 24 and subsequently compression members 24 may be placed into openings 26.

As shown in FIG. 2, free endplate 18 may contain a plurality of threaded openings 26 that extend through free endplate 18. Although free endplate 18 shown in FIG. 2 has four threaded openings 26, it is contemplated that in other embodiments, free endplate 18 may have more (e.g., 6, 8, 10) or less (e.g., 1, 2, 3) threaded openings, the number of which may correspond with the number of compression members 24 and locking nuts 32.

Following positioning of free endplate 18, locking nuts 32 may then be aligned with openings 26. In some embodiments, locking nuts 32 may be partially fastened to free endplate 18 by screwing each locking nut 32 part ways into the corresponding threaded opening 26.

Figure 6:
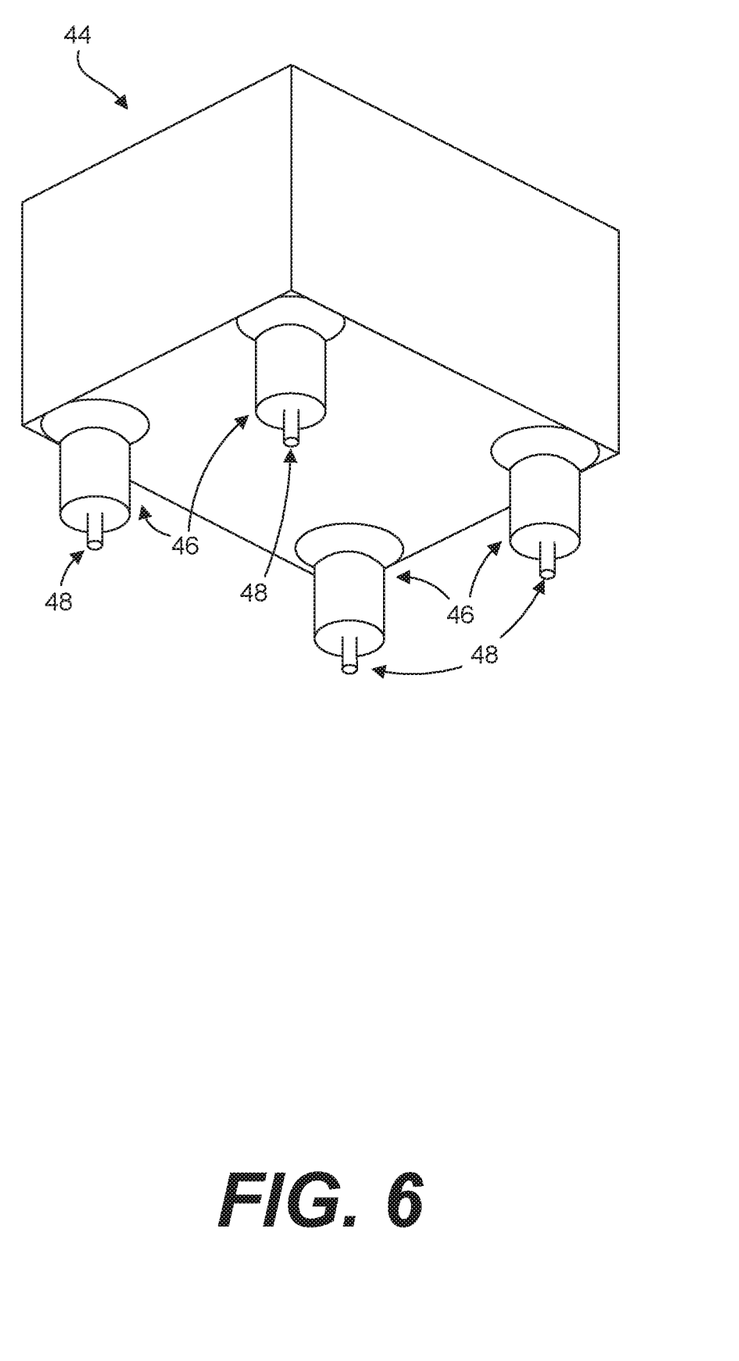
FIG. 6 is a bottom perspective view of a compression tool, according to an exemplary embodiment.
Figure 7:
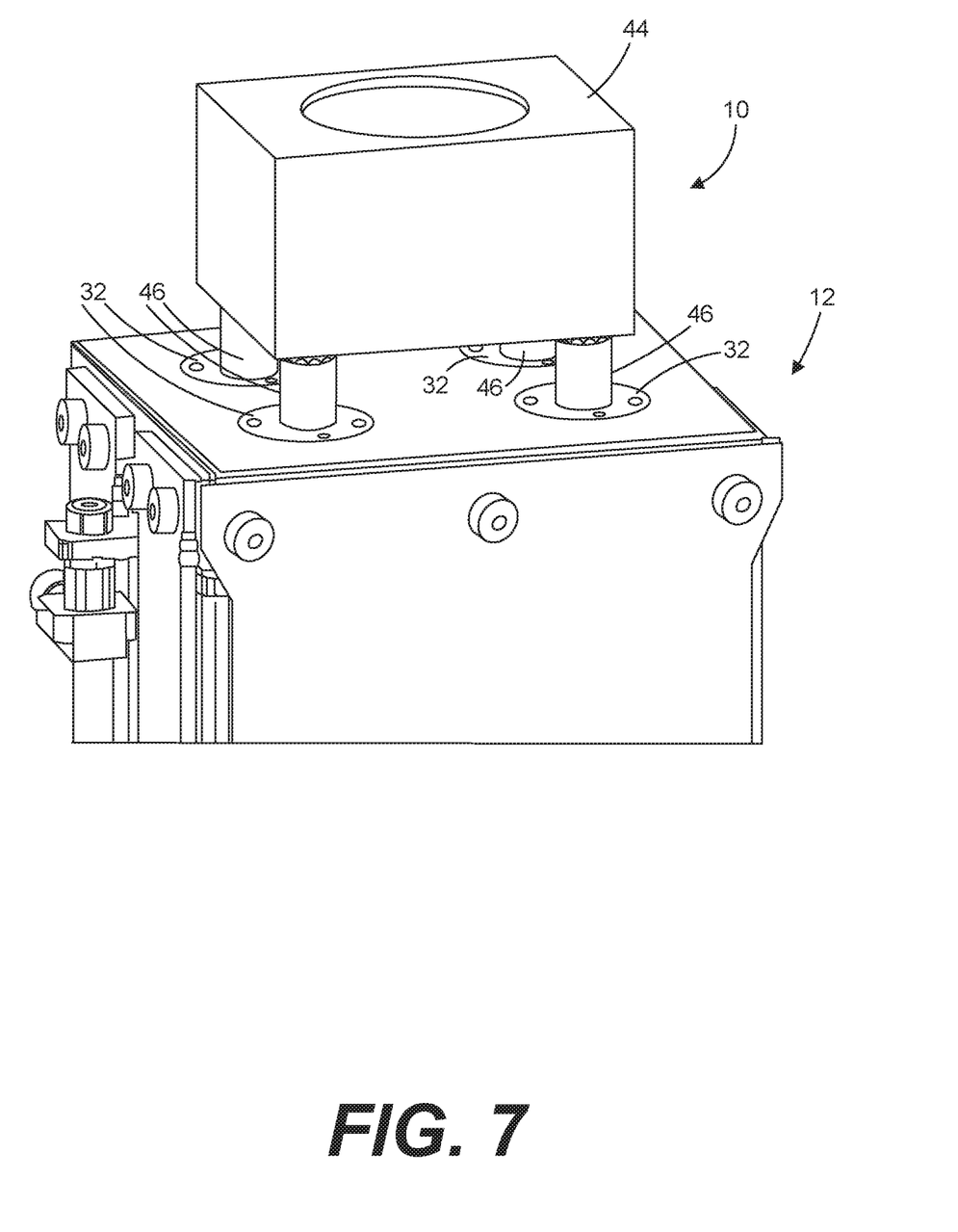
FIG. 7 is a perspective view of a portion of the electrochemical-cell stack of FIG. 1 with the compression tool of FIG. 6 positioned for compressing the electromechanical-cell stack assembly, according to an exemplary embodiment.
Figure 8:
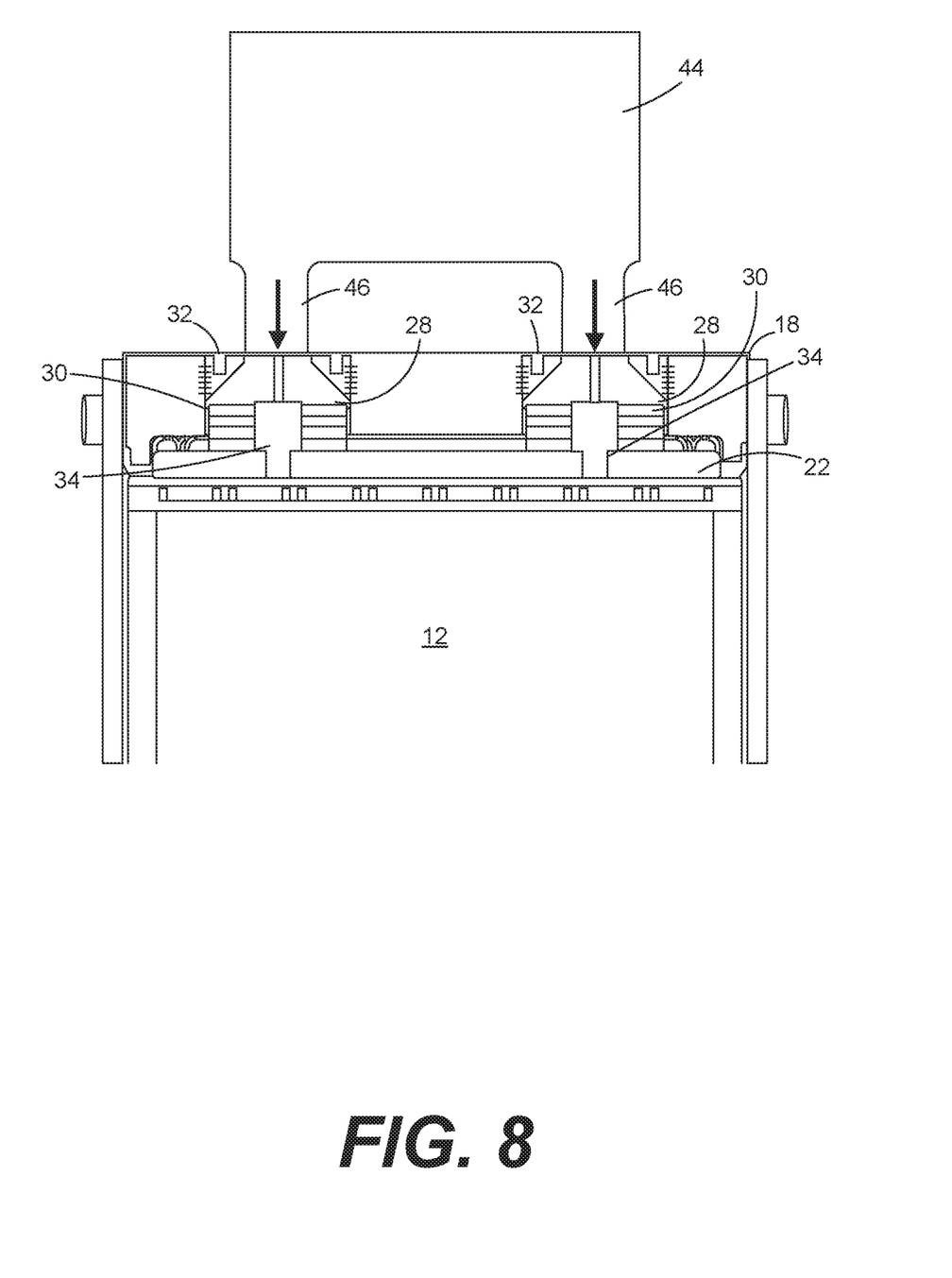
FIG. 8 is a cross-sectional side view of a portion of the electrochemical-cell stack of FIG. 1 with the compression tool of FIG. 6 positioned for compressing the electromechanical-cell stack assembly, according to an exemplary embodiment.

After placement of free endplate 18, the method of compressing stack 12 may comprise applying a force to compression plate 22 through compression members 24 configured to compress stack 12. The force may be applied by a compression device (e.g., a hydraulic press) using a compression tool 44, as shown in FIG. 6. Compression tool 44 may include a square or rectangular block having one or more legs 46 extending in the same direction from one surface. Legs 46 may be positioned to align with the arrangement of compression members 24 on compression plate 22. For example, as shown in FIGS. 7 and 8, when compression tool 44 is placed on top of stack 12, each leg 46 may be configured to contact an upper surface of a compression cap 28. The diameter of legs 46 may be configured to correspond to a diameter of the upper surface of compression caps 28, enabling legs 46 to contact the upper surfaces of compression caps 28 while passing through locking nuts 32. In some embodiments, each leg 46 may include an alignment peg 48 configured to pass into hole 42 of compression cap 28 to facilitate alignment of compression tool 44. In some embodiments, alignment peg 48 may be a dowel, a button, or any other suitable alignment feature.

As shown in FIG. 8, compression tool 44 can be used to apply a force to compression members 24 (i.e., compression cap 28 and belleville-washer stack 30), which then gets transferred to compression plate 22 and electrochemical stack 12. As described herein, the force is designed to compress stack 12. In some embodiments, the force may be applied until the electrochemical-cell stack 12 is compressed to a pre-determined height, which may correspond to the stack design and the number of cells in the stack. In other embodiments, the force may be applied for a predetermined duration. The force applied may exert about ten kilograms per square centimeter to about 50 kilograms per square centimeter of pressure. Stack 12 may be configured to be compressed to a height that is about 50% to about 60%, about 60% to about 70%, or about 70% to about 80% of an uncompressed height of stack 12.

After the force is applied and stack 12 is compressed to a desired level (e.g., a predetermined height), the method of compressing stack 12 may comprise attaching one or more tension plates 20 to fixed endplate 16 and free endplate 18. Tension plates 20 may be configured to maintain a fixed distance between the fixed endplate 16 and free endplate 18. As described herein, to attach tension plates 20 to fixed endplate 16 and free endplate 18, a plurality of endplate bolts 31 may pass through holes 39 in tension plates 20 and get threaded into corresponding holes 37 in free endplate 18 and fixed endplate 16. Before stack 12 is compressed, a distance from free endplate 18 to fixed endplate 16 may be greater than a length of tension plates 20. However, holes 39 in tension plates 20 and the corresponding holes 37 in fixed endplate 16 and free endplate 18 may align when stack 12 is compressed to the predetermined height. Tension plates 20 may be made out of a variety of materials, including, for example, aluminum, titanium, steel, carbon fiber.

Once tension plates 20 are attached to free endplate 18 and fixed endplate 16, the compressive force may then be transferred to tension plates 20. The method of compressing stack 12 may further comprise fastening locking nuts 32 to free endplate 18 in order to transfer the force from compression tool 44 to tension plates 20. For example, locking nuts 32 may be screwed down into openings 26 until they make contact with compression cap 28, as shown in FIG. 8. Locking nuts 32 may be tightened to a predetermined torque value. As shown, for example in FIGS. 2, 7, and 8, locking nuts 32 may include surface features (e.g., holes) configured to enable connection of a torque tool to aid in the tightening. Locking nuts 32 may be torqued to a predetermined value, which may be designed to prevent unscrewing of locking nuts 32 due to vibrations as well as thermal expansion and contraction.

When locking nuts 32 are properly fastened, locking nuts 32 will mate flush with the conical surface of compression caps 28, thereby restricting the movement of compression caps 28, belleville-washer stack 30 (e.g., compression members 24) and compression plate 22. Once completed, compression tool 44 and the force applied through compression tool 44 may be removed and stack 12 may remain in a state of compression.

While in the state of compression, endplate bolts 31 may transfer forces between tension plates 20 and fixed endplate 16 and free endplate 18. Forces may also be transferred between free endplate 18 and locking nuts 32. Forces may also be transferred between locking nuts 32 and compression members 24 (e.g., compression caps 28 and belleville-washer stacks 30). Forces may also be transferred between compression members 24 and compression plate 22. Forces may also be transferred between compression plate 22 and stack 12. A force being transferred between these components may be the expansion force exerted by stack 12, which may be counteracted by the compressive force maintained by compression system 14.

Having the compressive forces applied and maintained closer to the center of fixed endplate 16, free endplate 18, and compression plate 22, as described herein, may enable fixed endplate 16, free endplate 18, and compression plate 22 to have a reduced thickness while also reducing or eliminating bowing compared to traditional compression systems where the force is maintained on the outside or the periphery. Reducing the thickness will enable cost, weight, and size of compression system 14 and electrochemical-cell stack assembly 10 to be reduced. Reducing or eliminating bowing may also increase the uniformity and constancy of compression over time, as well as increase the uniformity and constancy of the force and pressure applied to stack 12.

Figure 9:
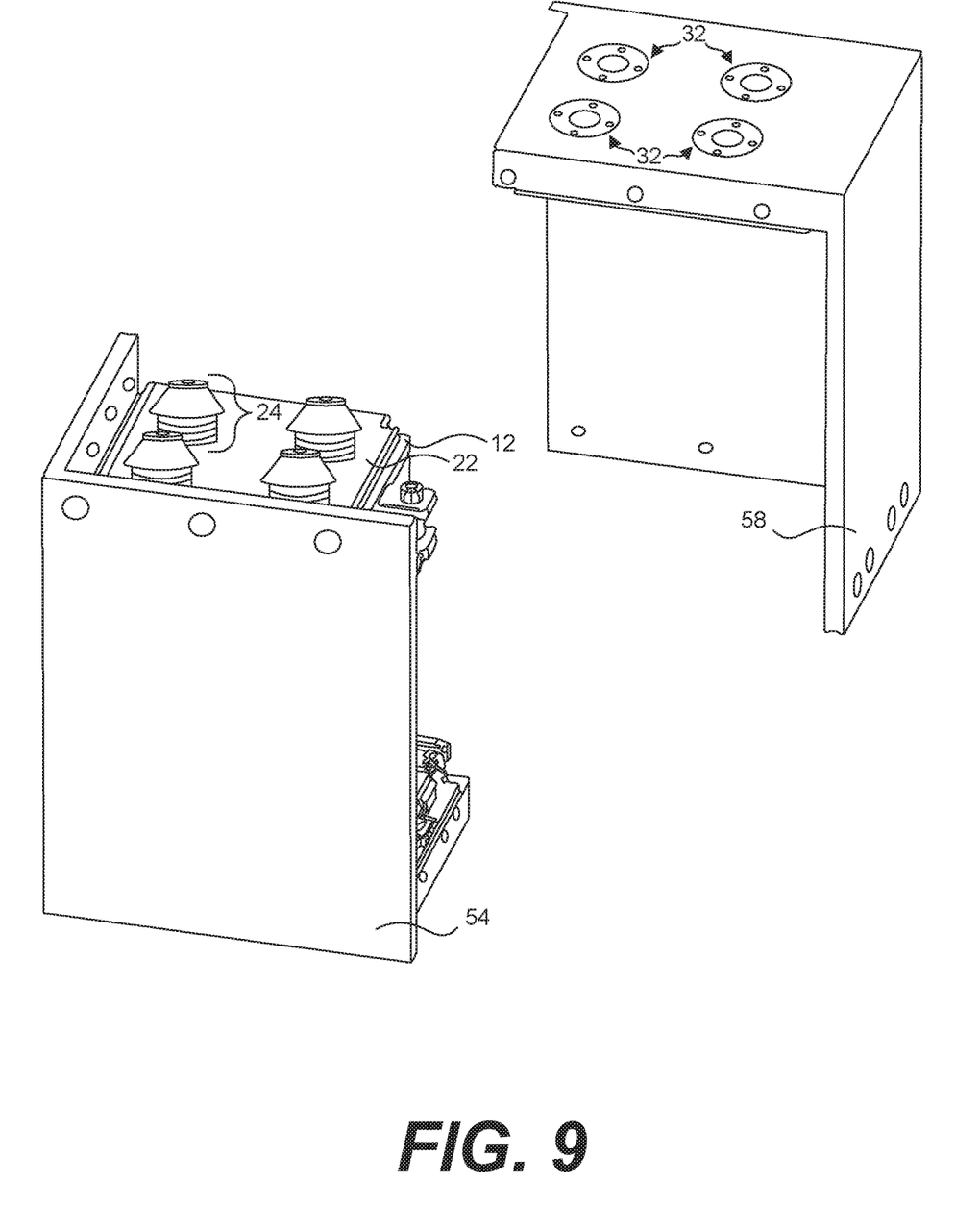
FIG. 9 is partially exploded perspective assembly view of a electromechanical-cell stack assembly, according to an exemplary embodiment.
Figure 10:
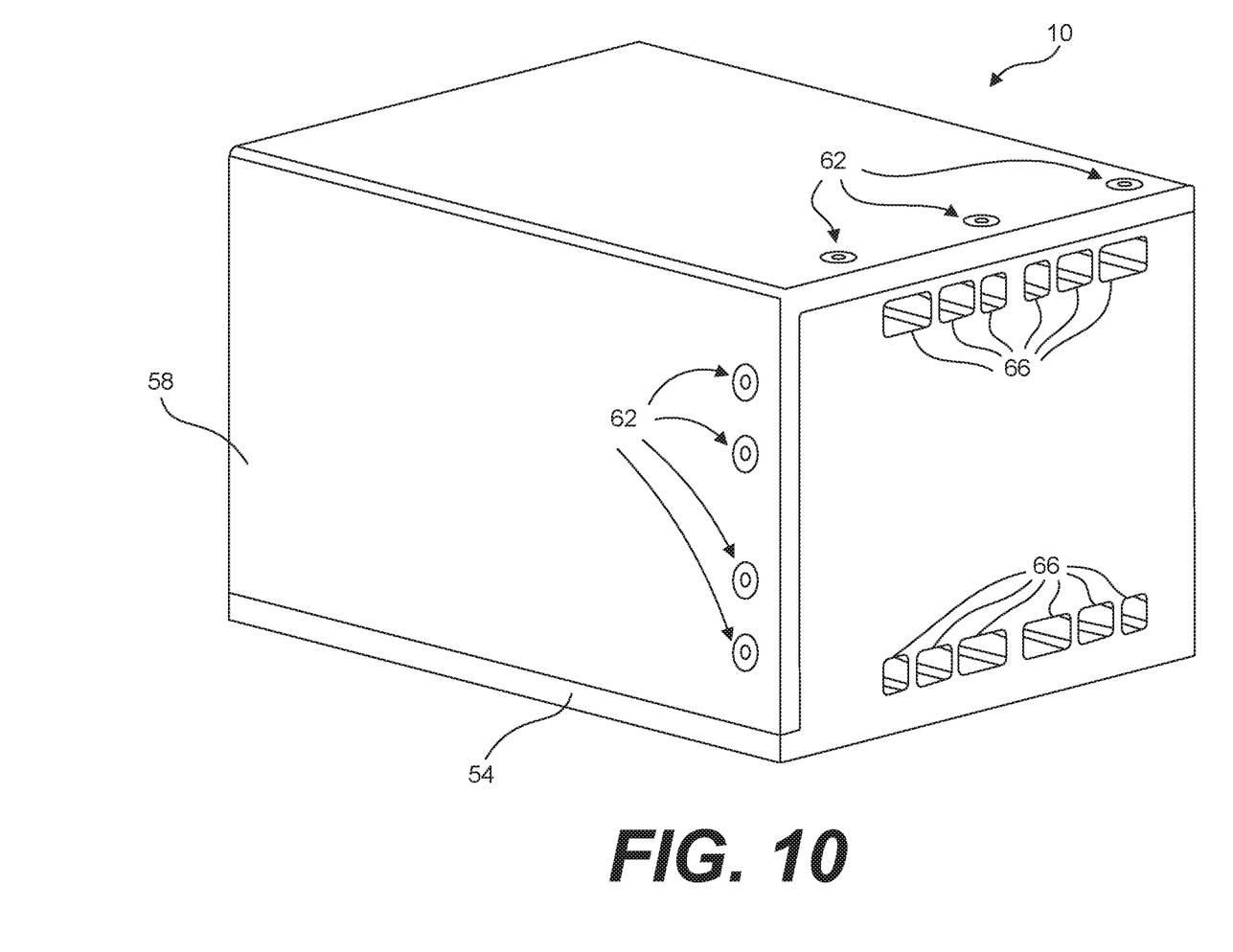
FIG. 10 is a perspective view of the electrochemical-cell stack assembly of FIG. 9, according to an exemplary embodiment.

In some embodiments, certain components of compression system 14 may be combined in order to simplify the design, reduce cost, reduce weight, and/or reduce assembly time. For example, FIG. 9 shows an exemplary embodiment wherein one or more tension plates 20 may be fixedly attached or manufactured as part of fixed endplate 16 and/or free endplate 18. For example, two tension plates 20 and fixed endplate 16 may be formed as a first single unit 54 and two other tension plates 20 and free endplate 18 may be formed as a second single unit 58. For such embodiments, the first single unit 54 and second single unit 58 may be bolted together as part of electrochemical-cell stack assembly 10. For example, FIG. 10 shows electrochemical-cell stack assembly 10 placed on its side and comprising first single unit 54 and second single unit 58 bolted together with bolts 62. Such arrangement may decrease the required assembly time because, for example, fewer bolts need to be secured. FIG. 10 also shows fluid manifolds 66 that may be within first single unit 54. Fluid manifolds 66 may be conduits for circulating fuel, oxidant, and coolant throughout electrochemical-cell stack assembly 10.

Figure 11:
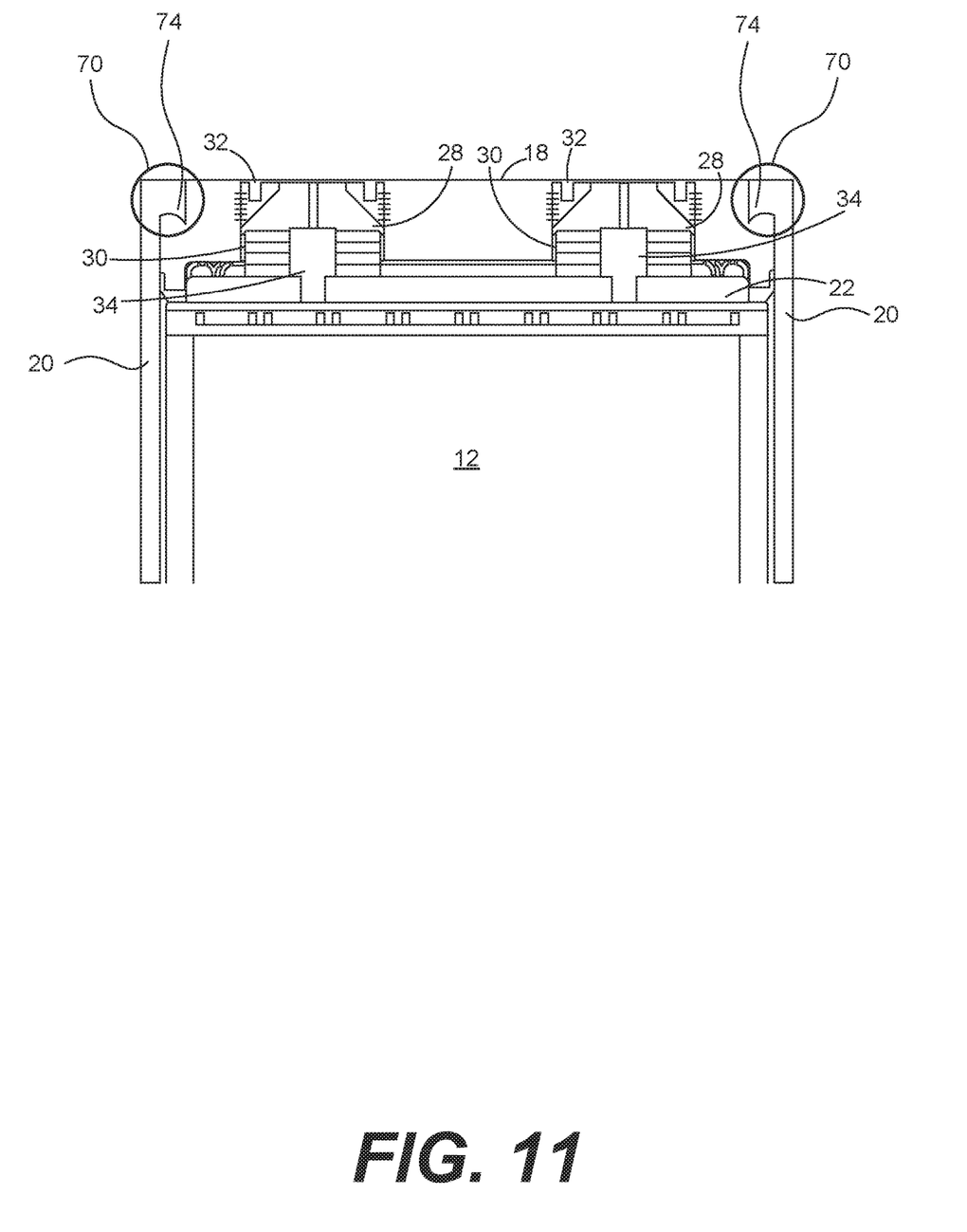
FIG. 11 is a cross-sectional side view of a portion of the electrochemical-cell stack assembly of FIG. 10, according to an exemplary embodiment.

In some embodiments, one or more tension plates may be coupled to one or more endplates without using bolts. For example, a ratchet mechanism may be used that will allow one or more tension plates to be snapped onto one or more endplates but will prohibit them from snapping off. In addition or instead of the ratchet mechanism, the tension plates may have right angles or hook-shaped features on their ends that may be slid over the edges of the endplates when the endplates are under compression from the hydraulic press. In some embodiments, this may be realized with dovetail joints. For example, FIG. 11 shows a cross-sectional side view of a portion of an exemplary embodiment of an electrochemical-cell stack assembly 10 with dovetail joints 70. As shown, dovetail joints 70 may comprise hook-shaped features 74 on tension plates 20 that may be slid over edges of free endplate 18. The edges of free endplate 18 may be cut to receive the hook-shaped features on tension plates 20. When the hydraulic press is removed, the right angles or hook-shaped features on the tension plates may hold the endplates fixed relative to each other.

In other embodiments, tension plates 20 may be replaced with a square tension sleeve designed to slide over the top of fixed endplate 16 and down around stack 12. For such embodiments, the tension sleeve may also serve as protective shield around stack 12. For example, the tension sleeve may protect against inadvertent contact with stack 12, dust protection, and water protection. In some embodiments, tension plates 20 may also be adapted to fully enclose stack 12 so they may also function as a protective shield. Using tension plates 20 and/or a tension sleeve as structural tension members as well as a protective shield may reduce the number of parts required to assemble electrochemical-cell stack assembly 10, which may reduce cost, assembly time, and/or assembly size.

Compression system 14 and the method of compressing stack 12, as described herein, may provide application of force and corresponding pressure over the active area of stack 12 that is more uniform than that achieved with a compression method where the principal compressive forces are transferred to the periphery or outside the active area of the electrochemical-cell stack. A more uniform compression may allow for less compression to be used while maintaining the same resistivity, thereby allowing for better gas flow through electrochemical-cell stack 12 and improved performance. A more uniform compression may facilitate better heat distribution, thereby decreasing chances of earlier failure of electrochemical-cell stack 12 due to overheating in area that would otherwise have higher concentrations of heat.

Another advantage of compression system 14 and the corresponding method of compression described herein is the reduction in assembly time compared to traditional compression systems (e.g., tie-rod compression systems). Because, the location where compression is applied during assembly and where it is maintained after assembly are the same, the step of transferring the compression to the tie-rods located at the periphery can be eliminated, thereby saving time.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, although described in relation to an electrochemical-cell stack, it is understood that the compression system described herein may be adapted for compressing other assemblies besides electrochemical-cell stacks.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application; such examples are to be construed as nonexclusive. Further, the steps of the disclosed methods can be modified in any manner, including reordering steps and/or inserting or deleting steps.

The term "about" or "approximately" as used herein means within an acceptable error range for the particular value as determined by one of ordinary skill in the art, which will depend in part on how the value is measured or determined, e.g., the limitations of the measurements system. For example, "about" can mean within one or more than one standard deviation per the practice in the art. Alternatively, "about" can mean a range of up to 20%, such as up to 10%, up to 5%, and up to 1% of a given value.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments of the present disclosure will be apparent to those skilled in the art from consideration of the specification and practice of the present disclosure herein. It is intended that the specification and examples be considered as exemplary only, with a true scope and spirit of the present disclosure being indicated by the following claims.

What is claimed is:

1. A method of compressing an electrochemical-cell stack, comprising:
    placing an electrochemical-cell stack on a first endplate;
    positioning a compression plate on the electrochemical-cell stack at an end opposite the first endplate;
    arranging one or more compression members on the compression plate;
    positioning a second endplate over the compression plate so that the one or more compression members align with one or more openings in the second endplate;
    applying a force to the compression plate through the one or more compression members until the electrochemical-cell stack is compressed to a predetermined height ranging from 50% to 80% of an uncompressed height of the stack;
    attaching one or more tension members to the first endplate and the second endplate, wherein the one or more tension members are configured to maintain a fixed distance between the first endplate and the second endplate; and
    fastening one or more locking nuts to the second endplate, wherein the one or more locking nuts are configured to secure the position of the one or more compression members and the compression plate relative to the second endplate.

2. The method of claim 1, wherein arranging the one or more compression members comprises evenly distributing at least one of the one or more compression members over an active area of the electrochemical stack.

3. The method of claim 1, wherein at least one of the one or more compression members comprises a stack of belleville-washers and a compression cap.

4. The method of claim 1, wherein the one or more locking nuts are positioned for fastening to the second endplate prior to applying the force to the compression plate.

5. The method of claim 1, wherein at the predetermined height, sets of holes at each end of the one or more tension members align with a set of holes in the first endplate and a set of holes in the second endplate.

6. The method of claim 1, further comprising:
    attaching the one or more tension members to the first endplate prior to placing the electrochemical-cell stack on the first endplate; and
    aligning the electrochemical-cell stack on the first endplate using the one or more tension members attached to the first endplate.

7. The method of claim 1, further comprising tightening the one or more locking nuts to a predetermined torque value.

\* \* \* \* \*